(12) United States Patent
Gonzalez et al.

(10) Patent No.: US 9,551,205 B2
(45) Date of Patent: Jan. 24, 2017

(54) MODULAR SECURING DEVICE FOR ROV AND DIVER MATE-ABLE SUBSEA APPLICATIONS

(71) Applicant: Teledyne Instruments, Inc., Thousand Oaks, CA (US)

(72) Inventors: Jose Raul Gonzalez, Ormond Beach, FL (US); Matthew Christopher Bartell, DeBary, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 14/582,165

(22) Filed: Dec. 23, 2014

(65) Prior Publication Data

US 2016/0177677 A1    Jun. 23, 2016

(51) Int. Cl.
   *E21B 41/00*     (2006.01)
   *F16B 7/20*      (2006.01)
   *F16B 21/04*     (2006.01)

(52) U.S. Cl.
   CPC .............. *E21B 41/0007* (2013.01); *F16B 7/20* (2013.01); *F16B 21/04* (2013.01)

(58) Field of Classification Search
   CPC ...... E21B 41/0007; E21B 41/04; E21B 41/00; F16B 21/00
   USPC ............... 166/351, 341, 340, 335, 360, 365; 285/121.4, 91; 292/57, 58, 60, 61, 63, 64, 292/66, 194, 219, 220, 221, DIG. 11, DIG. 30, 292/DIG. 63
   See application file for complete search history.

(56) References Cited

U.S. PATENT DOCUMENTS

| | | | | |
|---|---|---|---|---|
| 1,462,727 A * | 7/1923 | Williams | .............. | E05B 83/243 292/60 |
| 2,829,898 A * | 4/1958 | Tilden | ..................... | B23B 31/07 279/103 |
| 4,136,898 A * | 1/1979 | Guenther | ................ | E05C 3/042 292/244 |
| 6,113,160 A * | 9/2000 | Johansson | ............... | E05B 5/003 292/169 |
| 6,161,618 A * | 12/2000 | Parks | .................. | E21B 33/0355 137/236.1 |
| 8,387,702 B2 * | 3/2013 | Biester | .................. | E21B 33/038 166/338 |
| 8,430,002 B2 * | 4/2013 | Wasinger | ................ | B25B 13/06 81/124.2 |
| 8,499,839 B2 * | 8/2013 | Reid | ....................... | E21B 41/04 166/338 |
| 8,662,181 B2 * | 3/2014 | Hamblin | ............. | E21B 41/0007 166/338 |
| 8,869,661 B2 * | 10/2014 | Opstad | ................. | H01R 13/443 81/487 |
| 9,033,050 B2 * | 5/2015 | Long | ....................... | E21B 41/04 166/336 |
| 2006/0180313 A1 * | 8/2006 | Reynolds | ............ | E21B 41/0007 166/341 |

\* cited by examiner

*Primary Examiner* — James G Sayre
(74) *Attorney, Agent, or Firm* — Duncan Galloway Egan Greenwald, PLLC; Kevin T. Duncan

(57) ABSTRACT

The present invention relates generally to a modular locking and retaining mechanical design solution to reliably secure immersed, unrestrained and un-powered objects in a fluid environment to a fixed support surface such as a mounting frame or panel, with a quick connect/disconnect engagement method by a diver (i.e. manual mate) or remote-operated vehicles (ROVs) mate, into a fixed mounting frame or panel installed at a subsea deployed platform for oil and gas offshore applications.

25 Claims, 17 Drawing Sheets

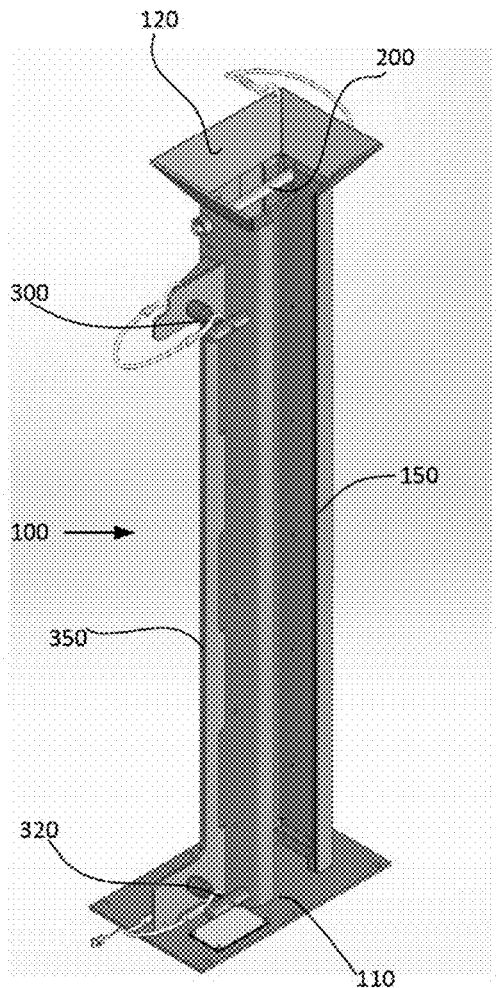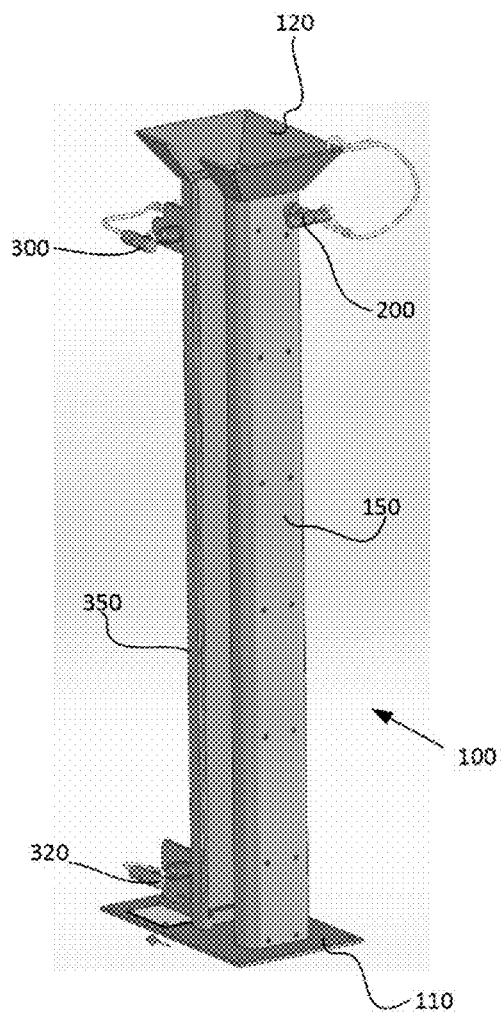
Fig. 1                    Fig. 2

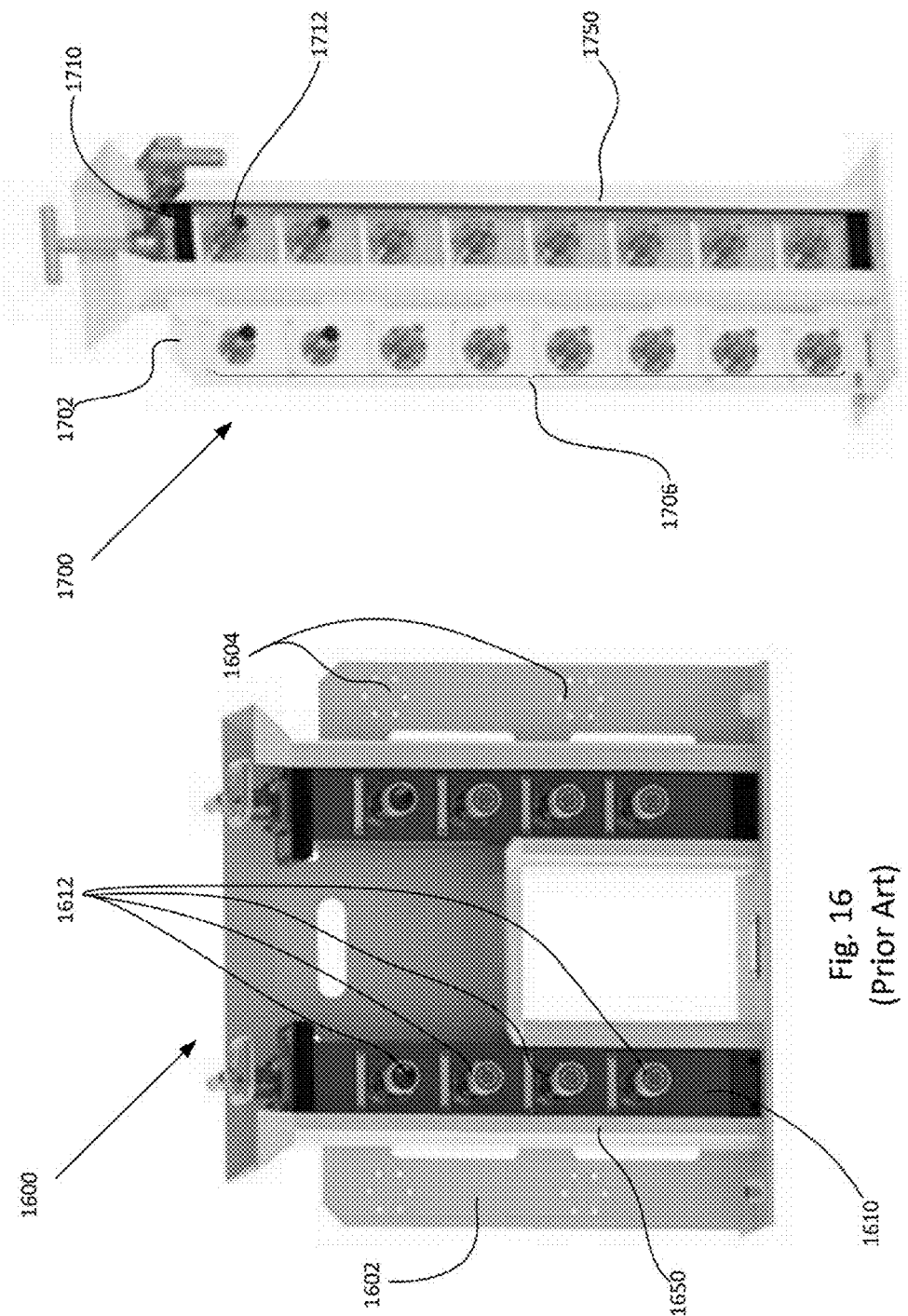

MODULAR SECURING DEVICE FOR ROV AND DIVER MATE-ABLE SUBSEA APPLICATIONS

FIELD OF THE INVENTION

The present invention relates generally to a modular locking and retaining mechanical design solution to reliably secure immersed, unrestrained and un-powered objects in a fluid environment to a fixed support surface such as a mounting frame or panel, with a quick connect/disconnect engagement method by a diver (i.e. manual mate) or remote-operated vehicles (ROVs) mate, into a fixed mounting frame or panel installed at a subsea deployed platform for oil and gas offshore applications.

BACKGROUND OF THE INVENTION

In offshore drilling and production operations, equipment are often subjected to harsh conditions thousands of feet under the sea surface with working temperatures of −50° F. to 350° F. with pressures of up to 15,000 psi. Subsea control and monitoring equipment commonly are used in connection with operations concerning the flow of fluid, typically oil or gas, out of a well. Flow lines are connected between subsea wells and production facilities, such as a floating platform or a storage ship or barge. Subsea equipment include sensors and monitoring devices (such as pressure, temperature, corrosion, erosion, sand detection, flow rate, flow composition, valve and choke position feedback), and additional connection points for devices such as down hole pressure and temperature transducers. A typical control system monitors, measures, and responds based on sensor inputs and outputs control signals to control subsea devices. For example, a control system attached to a subsea tree controls down-hole safety valves. Functional and operational requirements of subsea equipment have become increasingly complex along with the sensing and monitoring equipment and control systems used to insure proper operation.

To connect the numerous and various sensing, monitoring and control equipment necessary to operate subsea equipment, harsh-environment connectors are used with electrical cables, optical fiber cables, or hybrid electro-optical cables. Initial demand for subsea connector development was in connection with military applications. Over time demand for such connectors has grown in connection with offshore oil industry applications.

Early underwater connectors were electrical "dry-mate" devices, intended to be mated prior to immersion in the sea and were of two principal types: rubber-molded "interference fit" type and rigid-shell connectors. The rubber molded "interference-fit" connectors depended on receptacles with elastic bores that stretched and sealed over mating plugs. The rigid-shell connectors had mating parts sealed together via O-rings or other annular seals.

Ocean Design, Inc. has been an industry leader in the development of subsea connectors and applications. Dr. James Cairns' article Hybrid Wet-Mate Connectors: 'Writing the Next Chapter', Sea Technology, published July 1997, provides a thorough discussion of the history of underwater connectors through to 1997, and is a source for this background summary. In the early 1960s, electrical connectors intended for mating and de-mating underwater came into use. These so called "wet-mate" connectors were adaptations of the interference-fit dry-mate versions, and were designed so that when mated, the water contained in the receptacle bores would be substantially expelled prior to sealing. Also during this time, the first oil-filled and pressure-balanced electrical connector designs were introduced. These isolated the receptacle contacts within sealed oil-chambers which, during engagement, were penetrated by elongated pins with insulated shafts. Connection was, therefore, accomplished in the benign oil, not in harsh seawater. Unlike previous connector types which could not be disengaged at even modest depths, pressure balancing type connectors could be actuated anywhere in the sea. These wet-mate oil-filled connectors eventually became the high-reliability standard for the offshore oil industry. One critical design element of oil-filled connectors is providing seals that allow the oil chambers to be penetrated repeatedly without losing the oil or allowing seawater intrusion. One design widely used for electrical applications accomplishes this through the use of dielectric pistons, one of which resides in each receptacle socket. Each piston has a spring which biases it outward to automatically fill the socket's end-seal when the plug pin is withdrawn. During mating the pins push these pistons back through the oil-chamber ports (which they have kept sealed) and onward deep inside the sockets.

Early subsea wet-mate optical connectors passed only one optical circuit and used expanded-beam lenses or fiber-to-fiber physical contact junctions. To protect the optical interfaces, both the plug and receptacle contacts were housed in oil-filled chambers which were pressure balanced to the environment. Problems with this design included that sealing and cleanliness were not adequate to provide desired reliability. The spring/piston concept used for sealing electrical connectors is not effective for optical connectors as pistons get in the way of the light path. A second type of subsea-mateable optical connector consisted basically of dry-mate connectors which had a bit of optical index-matching gel placed in the contact interfaces. The excess gel was expelled upon mating. There was no attempt to exclude sand or silt from the interfaces, and the resulting performance was left to chance. Hybrid wet-mate devices were an attempt to combine oil-filled and pressure-balanced plug and receptacle housings with means for sealing and maintaining cleanliness of the optical interfaces. Within both, plug and receptacle, oil chambers, groups of contact junctions are aligned behind cylindrical rubber face-seals. When mated, opposed plug and receptacle seals first press against each other like the wringers of an old-fashioned washing machine, forcing the water out from between them. As the mating sequence continues the opposed plug and receptacle seals, like the wringers, roll in unison and transport any debris trapped between them off to the side. The action simultaneously causes clean, sealed, oil-filled passages to open between opposed plug and receptacle contact junctions. Continuing the mating process, plug pins advance through the sealed passages to contact sockets within the receptacle. De-mating is the reverse sequence. In the case of electrical circuits each mated pin/socket junction is contained in an individual, secondary, sealed oil chamber within the common oil volume. The contacts are unexposed to environmental conditions before, during and after mating.

There are many types of connectors for making electrical and fiber-optic cable connections in hostile or harsh environments, such as undersea or submersible connectors which can be repeatedly mated and de-mated underwater at great ocean depths. Current underwater connectors typically comprise releasably mateable plug and receptacle units, each containing one or more electrical or optical contacts or junctions for engagement with the junctions in the other unit when the two units are mated together. Each of the plug and receptacle units or connector parts is attached to cables or other devices intended to be joined by the connectors to form completed circuits. To completely isolate the contacts to be joined from the ambient environment, one or both halves of these connectors house the contacts in oil-filled, pressure-balanced chambers—this is referred to as a pressure balanced set-up. Such devices are often referred to as "wet-mate" devices and often are at such great depths that temperature and other environmental factors present extreme conditions for materials used in such devices. The contacts on one side (plug) are in the form of pins or probes, while the contacts or junctions on the other side (receptacle) are in the form of sockets for receiving the probes.

Typically, the socket contacts are contained in a sealed chamber containing a dielectric fluid or other mobile substance, and the probes enter the chamber via one or more sealed openings. Such wet-mate devices have previously been pressure compensated. One major problem in designing such pressure compensated or pressure balanced units is the performance and longevity of seals required to exclude seawater and/or contaminates from the contact chamber after repeated mating and de-mating.

Both the plug and receptacle halves of most fiber-optical connectors which are mateable in a harsh environment have oil-filled chambers. The chambers are typically brought face-to-face during an early step of the mating sequence. In a subsequent mating step, one or more connective passages, sealed from the outside environment, are created between the chambers of the mating connector halves. The passages join the two oil-filled chambers, creating a single, connected oil volume. Actual connection of the contact junctions then takes place within the common oil chamber. Examples of prior pressure compensated wet-mate devices are described in U.S. Pat. Nos. 4,616,900; 4,682,848; 5,838,857; 6,315,461; 6,736,545; and 7,695,301.

In some known underwater electrical connectors, such as that described in U.S. Pat. Nos. 4,795,359 and 5,194,012 of Cairns, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in a straightforward way for an optical connector since the optical contacts must be able to engage axially for practical purposes.

U.S. Pat. No. 4,666,242 of Cairns describes an underwater electro-optical connector in which the male and female connector units are both oil filled and pressure balanced. This device utilizes a penetrable seal element having an opening which pinches closed when the units are separated and seals against the entering probe when mated. Other known fiber-optic connectors have similar seals which are not suitable for use under some conditions and may tend to lose effectiveness after repeated mating and de-mating.

Other known seal mechanisms involve some type of rotating seal element along with an actuator for rotating the seal element between a closed, sealed position when the units are unmated, and an open position when the units are mated, allowing the contact probes to pass through the seal elements into the contact chambers. Such connectors are described, for example, in U.S. Pat. Nos. 5,685,727 and 5,738,535 of Cairns. These overcome some of the reliability problems of penetrable seals, for example, but can be too complex for miniaturized connectors.

Most existing wet-mate connectors of the pressure compensation-type depend on elastomers, which have several known disadvantages and which only grow as required temperature and pressure performance in the operating environments increase. Above 350° F. in particular, but at lower temperatures as well, elastomers in seawater degrade rapidly, and can fail due to numerous causes, including: rupture; rapid gas decompression (RGD) embolisms; leakage; melting; and gas permeation. Materials science has advanced to create new materials capable of functioning and lasting in harsher environments, but the industry is moving towards temperature regimes at or in excess of 400° F., where even the newest materials will be stressed to or beyond their limits.

Other pressure compensation systems typically rely on metal bellows, which have different weaknesses. At the scale of ever-smaller optical feedthrough systems, where diameters of compensation systems are typically less than an inch, the metal of the bellows are extraordinarily thin, and the welded joints may be subject to fatigue, opening up failure pathways similar to those of elastomers. One primary concern with deployable embodiments of wet-mate devices regarding pressure compensation is the use of elastomeric hoses. Operators experience signal loss on gas and gas-lift wells during start up and shutdown. At these events the gas functions in the well are dynamic and not at equilibrium. In addition, pressure compensated systems in gaseous environments have experienced complete loss of pressure compensation and infiltration of seawater into spaces that should be dielectrically insulated by oil.

Thus, common underwater connectors comprise releasably, mateable plug and receptacle units, each containing one or more electrical or optical contacts or junctions for engagement with the junctions in the other unit when the two units are mated together. The contacts on one side are in the form of pins or probes, while the contacts or junctions on the other side are in the form of sockets for receiving the probes. Typically, the socket contacts are contained in a sealed chamber containing a dielectric fluid or other mobile substance, and the probes enter the chamber via one or more sealed openings. One major problem in designing such units is the provision of seals which will adequately exclude or evacuate seawater and/or contaminants from the contact chamber after repeated mating and de-mating operations.

There are many types of housings and frames for mounting or securing modular connectorized distribution units (MCDUs) in a fluid environment. These housings secure the MCDUs which are subsea distribution units which may provide oil-filled, pressure-balanced, connectorized junctions for flexible underwater mating for a variety of wet mate connectors. An MCDU functions as the hub of an expandable subsea network. The MCDUs may be used to join multiple circuits of optical, electrical, or hybrid connection type configurations. The MCDU is designed to interface with a variety of subsea structures.

MCDUs are typically installed on a housing or landing frame on the surface prior to being secured in a sub-sea environment. MCDU landing frames are typically installed on concrete slabs or attached to larger sub-sea structures. These MCDUs and MCDU landing frames may have originally been designed and intended to withstand 20-25 years in a corrosive, turbid environment. However, in normal applications, MCDUs may need to be removed for refurbishment or repair after only 5-8 years as a result of factors including galvanic corrosion.

Furthermore, MCDUs and other sub-sea devices may need to be moved from their original location or removed entirely due to factors other than equipment failure. For example, a planned oil well may not be economically feasible due to the oil reserve not being as large as originally surveyed. Also, in the field of sub-sea mining, equipment may need to be moved or replaced more frequently as a seam of minerals or ore is surveyed and mined. Sub-sea mining equipment also may require more power than sub-sea oil drilling equipment and may therefore put additional strain on equipment such as MCDUs, requiring more frequent refurbishment or repair.

Typically, when an MCDU needs to be replaced or removed, removal is difficult because of the buildup of silt and other particulates and because of galvanic corrosion. These and other factors may make it hard if not impossible to remove an MCDU from its landing frame, resulting in the inability to remove, reuse, or refurbish either the frame or the MCDU. Refurbishing an MCDU is economically desirable over replacing and MCDU due to the very high equipment cost per MCDU. Removing and refurbishing an MCDU also eliminates the need to install a new landing frame or remove existing landing frames that may not be able to be separated from an MCDU using existing securing methods.

Additionally, when connecting various wet-mate type connectors to or from an MCDU, problems exist in securing connectors, cables, remote operate vehicles (ROVs), and other materials. Currently there exists no method for securing immersed, un-restrained objects in seawater or freshwater with vertical stability and a positive meta-centric height to a fixed structure, neutralizing the buoyancy force effect.

What is needed is a system for the maintaining of a secured, consistent, stably removable MCDU housing position into a landing base frame to facilitate a reliable mating/de-mating alignment capability with connector harnesses by manual (i.e. diver) mating or by a remote-operated vehicle (ROV) mating methods.

SUMMARY OF THE INVENTION

Embodiments described herein provide a new modular securing device for ROV and diver mate-able subsea applications.

The present invention comprises a modular and versatile mechanical design that provides a quick, reliable and low-cost solution to secure immersed, un-restrained objects in seawater or freshwater with vertical stability and a positive meta-centric height to a fixed structure, neutralizing the buoyancy force effect. The present invention also reduces the risk of mating and/or de-mating connectors and reduces the probability of misalignments which may result in unreliable and costly failures for the subsea applications.

The present invention provides a T-handle locking key and T-handle ACME threaded shaft/stud assembly for securing an MCDU and removable parking plate to an MCDU landing unit. Use of the quick disconnect T-handle locking key and threaded T-handle body and stud assemblies for attaching an MCDU to an MCDU landing frame provides the benefit of easy and quick removal or replacement of an MCDU or parking plate. The modular securing devices may be operated either manually by a diver or remotely by an ROV. The modular securing devices according to the present invention may also be used in other configurations and with other frames, structures, or devices as a method of securing one apparatus to another in a sub-sea environment.

In one embodiment, the present invention comprises a modular securing device comprising: a frame having a base, a top, and a body, said body having a front, a back, and extending vertically from said bottom to said top and having a hollow central area and an opening extending the length of the front; a locking key assembly comprising: a locking key comprising: an elongated body having a front end, a back end, and an exterior surface; a t-shaped handle attached to said back end; a raised protrusion extending vertically from said exterior surface at said front end; a spring assembly comprising a tension spring disposed on the elongated body intermediate an inner plate and an outer plate, and said spring surrounding said elongated body between said inner plate and said outer plate; and a set of bushings having a front face and a back face, and a central bore, said back face attached to said frame, said set of bushings adapted to receive said front end of said elongated body and having a guide channel adapted to guide said raised protrusion of said locking key when receiving said front end of said elongated body, and a recess formed therein for receiving the raised protrusion; whereby with said locking key introduced into said frame said t-shaped handle is adapted to be pushed forward to compress said tension spring between said inner and outer plates and to cause the raised protrusion to extend outward from the guide channel, said locking key adapted to rotate to lock in a fixed position with said raised protrusion engaging the recess, thereby securing a modular connection unit received in the frame central hollow area in place.

The above embodiment may further comprise wherein the locking key assembly is located at said top of said frame and is adapted to permit said locking key to pass through said frame. The locking key may be attached to said frame by a flexible securing means. The flexible securing means may be a braided cable. The set of bushings may comprise a first bushing and a second bushing. The set of bushings may have a set of indentations on said front of said bushings adapted to secure said raised protrusion of said locking key. The modular securing device may further comprise a set of threaded securing assemblies comprising: a cylindrical stud assembly having a top and a bottom, and a body extending from said bottom to said top, said body having an exterior, said exterior having a threaded portion; and a cylindrical handle assembly having a top and a bottom, a body extending from said top to said bottom, said bottom having an opening, said body having a hollow interior threaded portion, and a handle attached to said top. The cylindrical stud assembly threaded portion and said cylindrical handle assembly hollow threaded portion may comprise ACME threading. The locking key assembly and said set of threaded securing assemblies may be comprised of a material resistant to galvanic corrosion. The body of said cylindrical stud assembly and said body of said cylindrical handle assembly may be comprised of brass. The frame may be adapted to receive a modular connectorized distribution unit (MCDU). The frame may further comprise a mounting assembly, said mounting assembly having a front and a back, and a first side and a second side, said first side attached to the frame and said mounting assembly extending outwardly from the frame.

In another embodiment, the present invention may comprise a modular securing apparatus comprising: a locking key assembly comprising: an elongated locking key body with a first and a second end and having a handle on said first end and a raised protrusion on said second end; said elongated locking key assembly having a spring assembly at said first end, said spring assembly comprising a spring, an inner spring plate, and an outer spring plate; a set of bushings adapted to receive said elongated locking key assembly and said raised protrusion and having a set of locking indentations; and wherein said spring assembly is adapted to compress to allow said raised protrusion to pass through said set of bushings and is further adapted to secure said raised protrusion in one of said set of locking indentations.

The above embodiment may further comprise wherein the modular securing apparatus further comprises a set of threaded securing assemblies comprising: a body portion having an exterior threaded portion; and a handle portion having an interior threaded portion and adapted to receive said body portion. The modular securing apparatus may further comprise a frame having a base, a top, and a body, said body having a hollow central area and an exterior surface; wherein elongated locking key assembly is disposed near said top of said frame; and wherein said threaded securing assemblies are disposed on the exterior surface. The elongated locking key assembly may be located at said top of said frame and is adapted to permit said locking key body to pass through said frame. The locking key may be attached to said frame by a flexible securing means. The flexible securing means may be a braided cable. The set of bushings may comprise a first bushing and a second bushing. The set of bushings may have a set of indentations on said front of said bushings adapted to secure said raised protrusions of said locking key. The body threaded portion and said handle interior threaded portion may comprise ACME threading. The locking key assembly and said set of threaded securing assemblies may be comprised of a material resistant to galvanic corrosion. The body of said cylindrical stud assembly and said body of said cylindrical handle assembly are comprised of brass. The frame may be adapted to receive a modular connectorized distribution unit (MCDU). The frame may further comprise a mounting assembly, said mounting assembly having a front and a back, and a first side and a second side, said first side disposed on said frame exterior and said mounting assembly extending outwardly from said frame. The threaded securing assemblies may be disposed on said front of said mounting assembly.

BRIEF DESCRIPTION OF THE DRAWINGS

In order to facilitate a complete understanding of the present invention, this system, and the terms used, reference is now made to the accompanying drawings, in which like elements are referenced with like numerals. These drawings should not be construed as limiting the present invention or system, but are exemplary and for reference.

FIG. 1 provides a perspective view of an embodiment of the modular securing device according to the present invention;

FIG. 2 provides a reverse angle perspective view of an embodiment of the modular securing device according to the present invention;

FIGS. 16-17 provide perspective views of prior art MCDU landing frames that may be modified according to the present invention.

DETAILED DESCRIPTION

Figure 3:
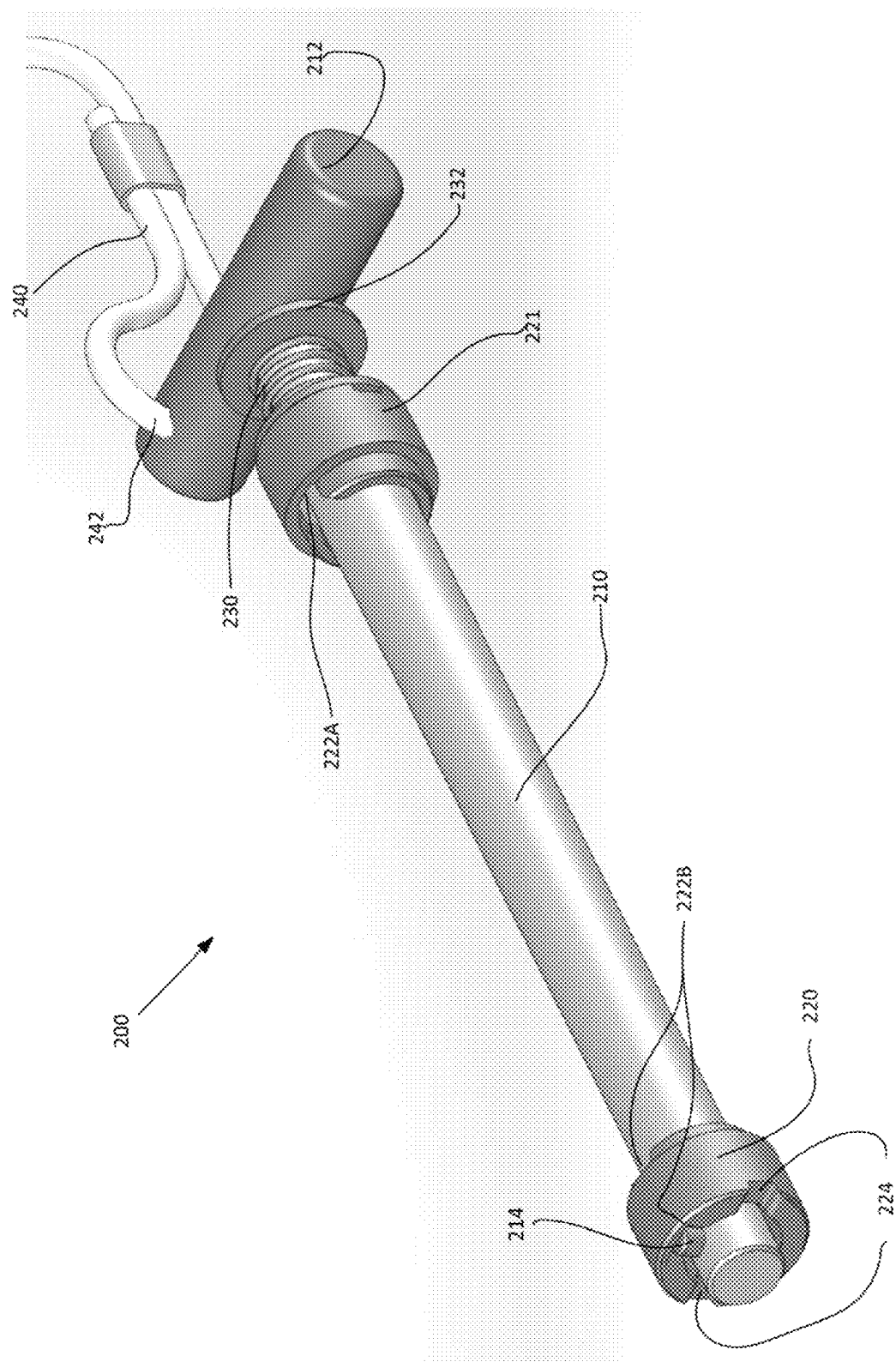
FIG. 3 provides a perspective view of an embodiment of a T-handle locking key and fixed holding bushings according to the present invention.

The present invention and system will now be described in more detail with reference to exemplary embodiments as shown in the accompanying drawings. While the present invention and system is described herein with reference to the exemplary embodiments, it should be understood that the present invention and system is not limited to such exemplary embodiments. Those possessing ordinary skill in the art and having access to the teachings herein will recognize additional implementations, modifications, and embodiments as well as other applications for use of the invention and system, which are fully contemplated herein as within the scope of the present invention and system as disclosed and claimed herein, and with respect to which the present invention and system could be of significant utility.

Certain embodiments as disclosed herein provide for a modular securing device for ROV and diver mate-able subsea applications in which a single T-handle locking key is attached to the upper portion of an MCDU landing frame and a pair of ACME threaded T-handle shaft/stud assemblies are attached to protrusions on the side of the MCDU landing frame. In one embodiment, the upper and a lower ACME threaded T-handle shaft/stud assemblies are attached to respective upper and lower protrusions on the MCDU frame.

The drawings illustrate exemplary embodiments of methods and apparatuses for securing items, connections, frames, or assemblies to an MCDU landing frame in a turbid fluid environment, using a combination of T-handle locking keys and ACME threaded T-handle shaft/stud assemblies.

With reference now to FIG. 1, a perspective view of a first exemplary embodiment of the modular securing device 100 according to the present invention is provided. The modular securing device 100 comprises the MCDU landing frame 150, removable parking plate mounting frame 350, base 110, and upper frame portion 120. A T-handle locking key 200 is mounted below the upper frame portion 120 and extends horizontally through the body of the MCDU landing frame 150. An ACME threaded T-handle shaft/stud assembly 300 and a lower ACME threaded T-handle shaft/stud assembly 320 are mounted on the upper portion and lower portion of the removable parking plate mounting frame 350 respectively.

With reference now to FIG. 2, a reverse angle perspective view of an embodiment of the modular securing device 100 is provided. The handle of the T-handle locking key 200 can be seen extending from the exterior of the MCDU landing base/frame 150 below the upper frame portion 120. The ACME threaded T-handle shaft/stud assembly 300 and a lower ACME threaded T-handle shaft/stud assembly 320 on the removable parking plate mounting frame 350 extend out from the parking plate mounting frame 350 towards the front of the modular securing device 100. The base 110 may be used to mount the modular securing device 100 to any subsea structure.

Figure 4:
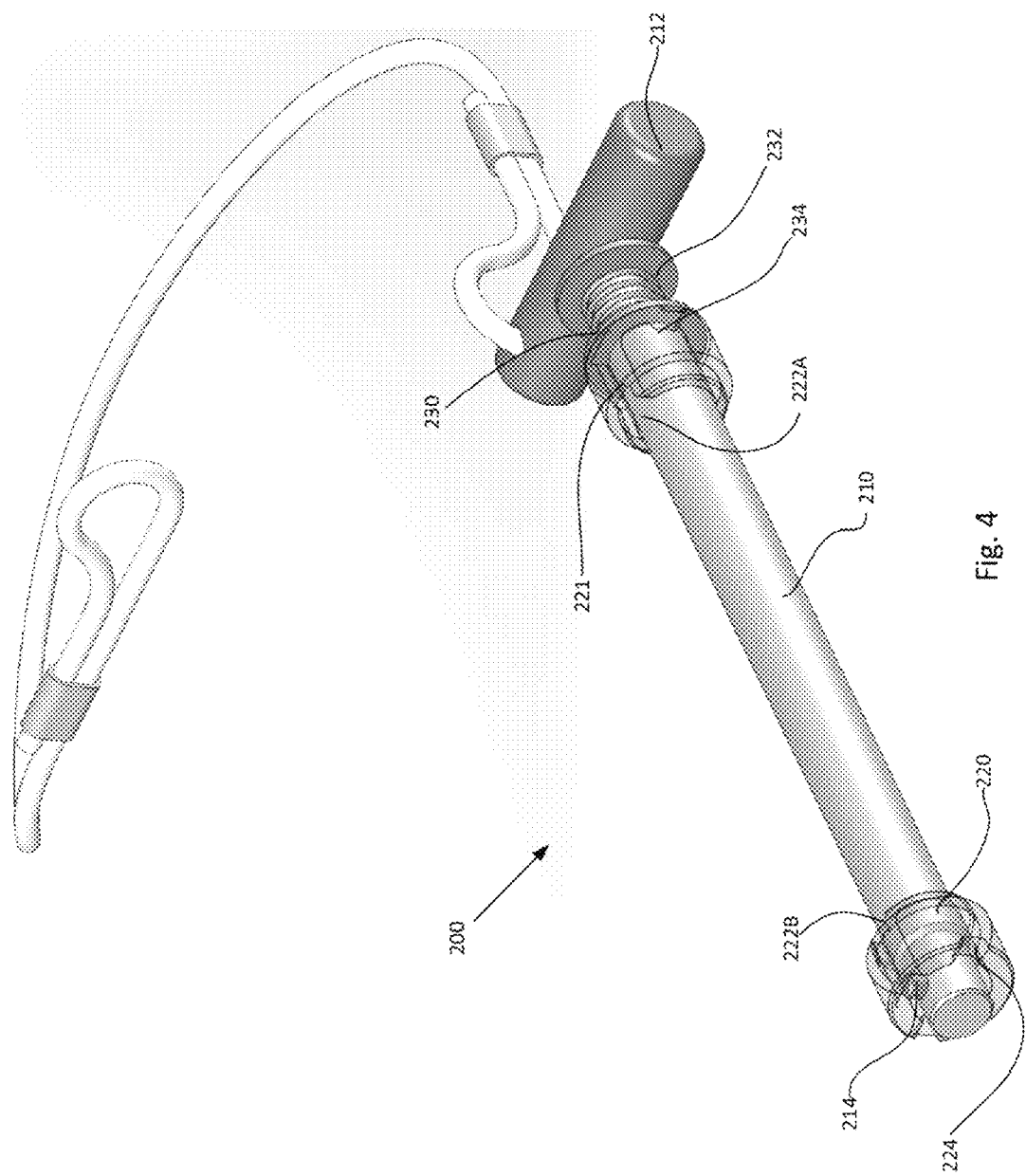
FIG. 4 provides a perspective view of an embodiment of a T-handle locking key with a cutaway view of the fixed holding bushings according to the present invention.

With reference now to FIGS. 3 and 4, a perspective view of an exemplary embodiment of a T-handle locking key 200 is provided. The T-handle locking key 200 with T-handle 212, and T-handle shaft 210 is shown with a pair of fixed holding bushings 220 and 221. An attaching device or lanyard 240, which may be at a securing device attachment point 242, a lanyard, cord, braided cable, wire, rope, or other suitable material, is attached to the T-handle 212 and, as shown in FIG. 2, also to the body of the MCDU frame 150 to prevent the T-handle locking key 200 from drifting away when not in an engaged and locked state.

With T-handle locking key 200 in place, the first fixed holding bushing 220 and second fixed holding bushing 221 are mounted on opposite lateral sides of the MCDU landing base/frame 150. Each of the fixed holding bushings 220 and 221 may comprise a quick-alignment slot 222B and 222A, respectively, at the top of the bushing and a pair of locking indentations 224 oriented along the horizontal axis of the bushing. The quick-alignment slots 222A and 222B guide the quick-alignment keyed pin 214 of the T-handle locking key 200 through the each of the bushings 220 and 221. After being inserted through both bushings 220 and 221 and clearing the exterior surface of fixed holding bushing 220, the T-handle locking key 200 and quick-alignment keyed pin 214 may be rotated ninety degrees clockwise or counter-clockwise to lock the quick-alignment keyed pin 214 into either of the locking indentations 224.

The quick-alignment keyed pin 214 is held into a locking indentation 224 by a compression spring force exerted by the tension spring 230. The tension spring 230 exerts a spring force along the length of the T-handle locking key 200 by pressing on both of the outer spring plate 232 and inner spring plate 234. The outer spring plate 232 and inner spring plate 234 keep the tension spring 230 in position and when the T-handle locking key 200 is inserted fully through both of the fixed holding bushings 220 and 221 the exterior of the second fixed holding bushing 221 facing the inner spring plate 234 contacts the inner spring plate 234 and moves the plate 234 along the axis of the T-handle shaft 210 towards the T-handle 212. This movement compresses the tension spring 230 which causes a low torque spring force to hold the quick-alignment keyed pin 214 in place in the locking indention 224 of the fixed holding bushing 220.

The compression spring force principle is used in combination with a low torque and a mechanically keyed drive alignment design fixture to assure a quick connect/disconnect. This design provides a reliable and secure locking capability to neutralize the buoyancy effect from the Archimedes principle of buoyancy of objects immersed in a fluid. The design also utilizes the material compatibility to avoid galvanic corrosion effect from dissimilar materials in contact with each other, and immersed in an electrolytic solution such as seawater. All components of the T-handle locking key 200 and ACME threaded T-handle shaft/stud assembly 300 may be made in similar fashion and from compatible materials which include 316 and 316L SST, and a bronze (anti-friction material) for marine and subsea applications.

With reference now to FIG. 4, a perspective view of an embodiment of T-handle locking key 200 with a cutaway view of the fixed holding bushings 220 and 221 is provided. The T-handle locking key 200 is shown inserted through bushing 221 and partially through bushing 220. At this point, the quick-alignment keyed pin 214 has not cleared the exterior of the bushing 220 and is still in the quick-alignment slot 222B. It can be seen that the portion of the T-handle shaft 210 that the keyed alignment pin 214 is fixed to is of a smaller radius and circumference than the rest of the T-handle shaft 210. If manually operated or operated by a ROV, the T-handle 212 would need to be further depressed towards the bushing 221 to allow the quick-alignment keyed pin 214 to clear the bushing 220 so that the T-handle locking key 200 could be rotated ninety degrees clockwise or counter-clockwise to secure the quick-alignment pin 214 in one of the locking indentations 224.

Figure 5:
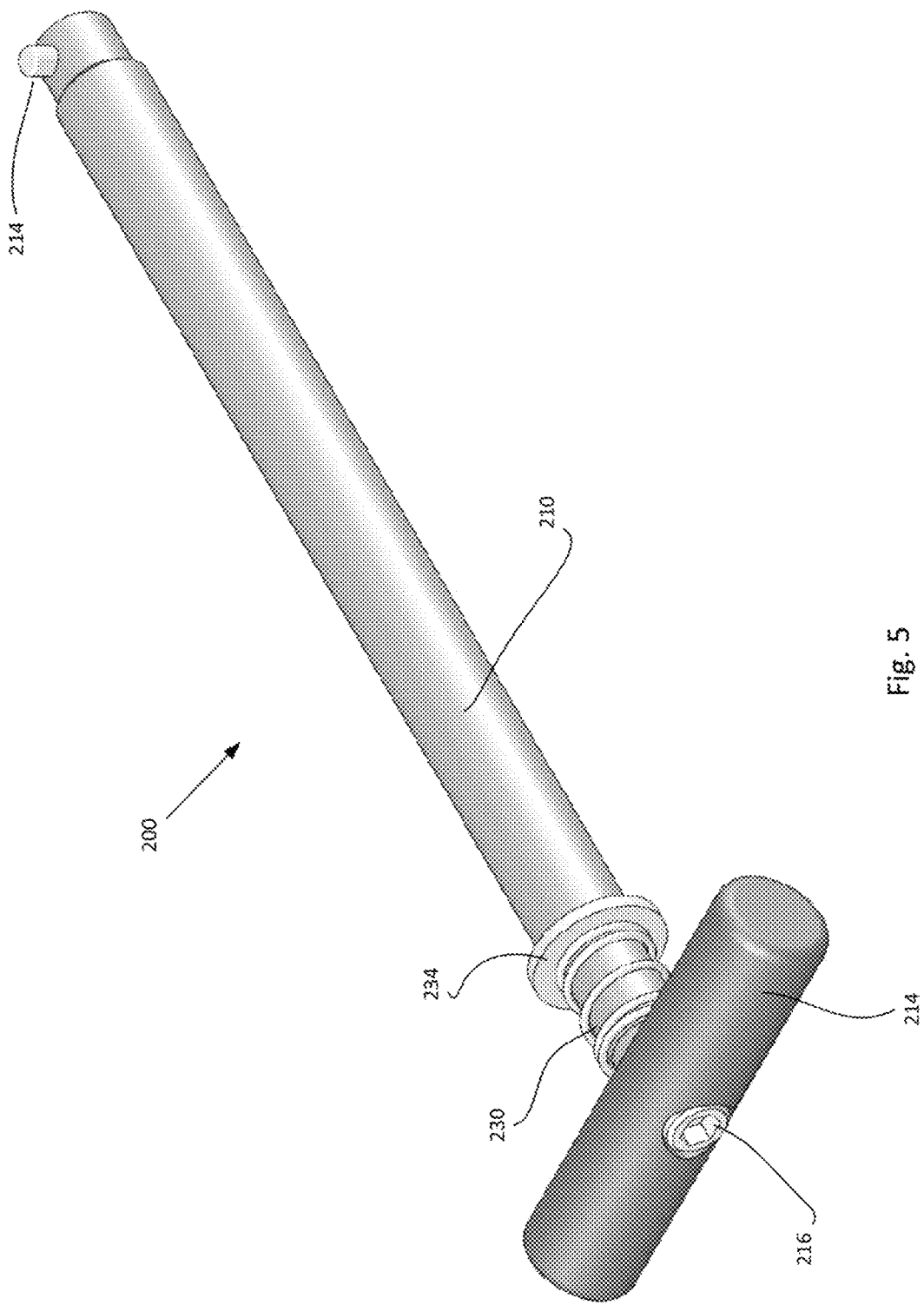
FIG. 5 provides another a perspective view of an embodiment of a T-handle locking key according to the present invention.

With reference now to FIG. 5, a perspective view of an embodiment of T-handle locking key 200 is provided. The tension spring 230 around the T-handle body 210 can be seen held in place by the inner spring plate 234. In operation, the inner spring plate 234 compresses the tension spring 230 which then exerts a compression spring force along the axis of the T-handle body 210. This force will put pressure on the quick-alignment keyed pin 214 that will retain the quick-alignment keyed pin 214 in a locking indentation 224 until a reverse operation occurs. The T-handle 212 is attached to the T-handle body 210 via an attaching means 216 which may be any of screw, bolt, hex screw, locking screw, or similar suitable attaching means.

Figure 6:
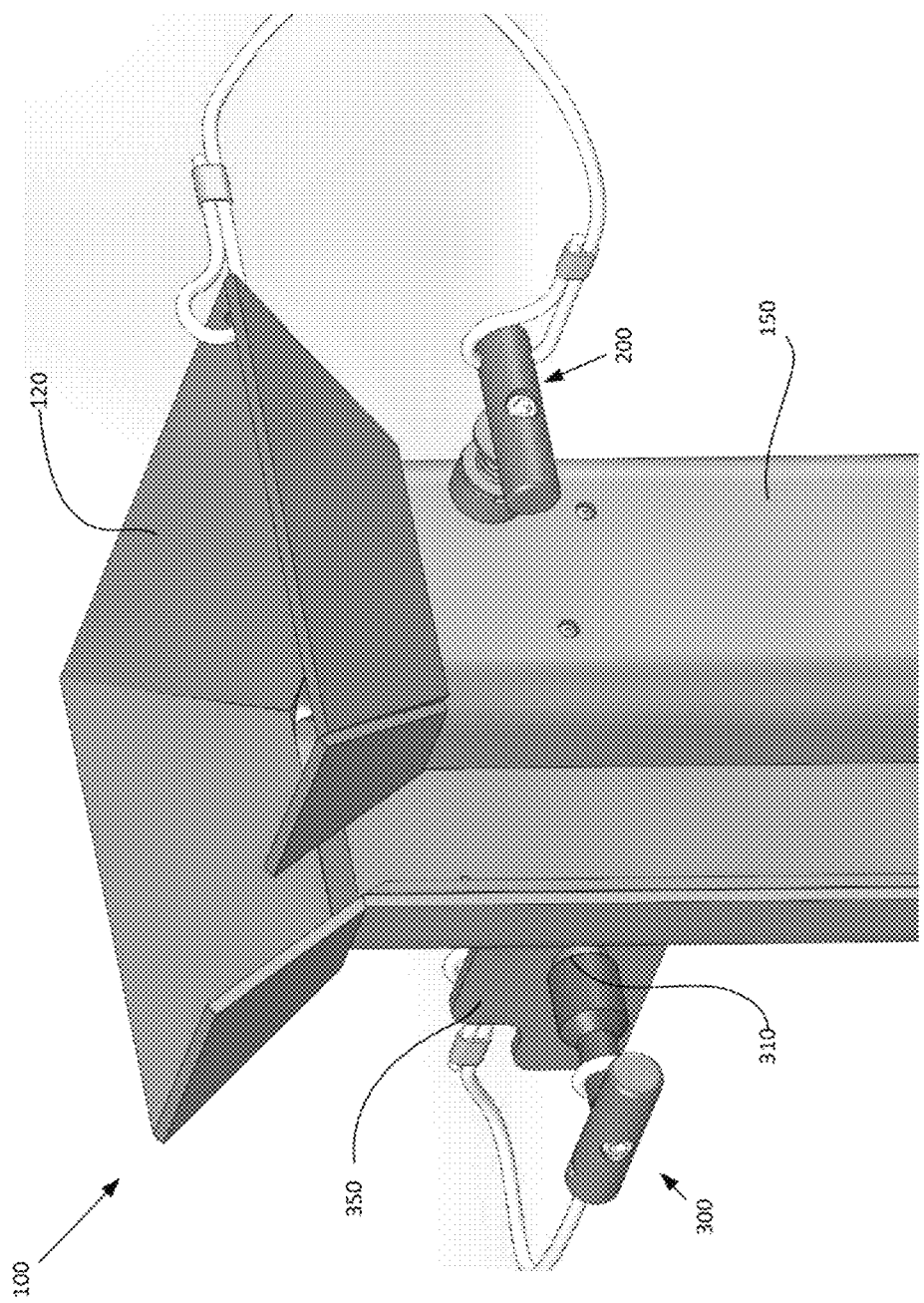
FIG. 6 provides a detailed perspective view of an embodiment of the upper section of a modular securing device according to the present invention.

With reference now to FIG. 6 a detailed perspective view of an embodiment of the upper section of the modular securing device 100 is provided. In this view, the T-handle locking key 200 is inserted, e.g., via a bushing, in the frame of the MCDU landing base/frame 150 below the upper frame portion 120. On the opposite side of the T-handle locking key 200 is the upper ACME threaded T-handle shaft/stud assembly 300 which is secured to the ACME threaded stud 310 which is in turn formed in or attached to the removable parking plate frame 350. The ACME threaded T-handle shaft/stud assembly 300 is used to releaseably attach a parking plate to the MCDU landing base frame 150. The ACME threaded T-handle shaft/stud assembly 300 may be comprised of brass or another low friction material that assures quick, reliable, and secure engagement and disengagement.

Figure 7:
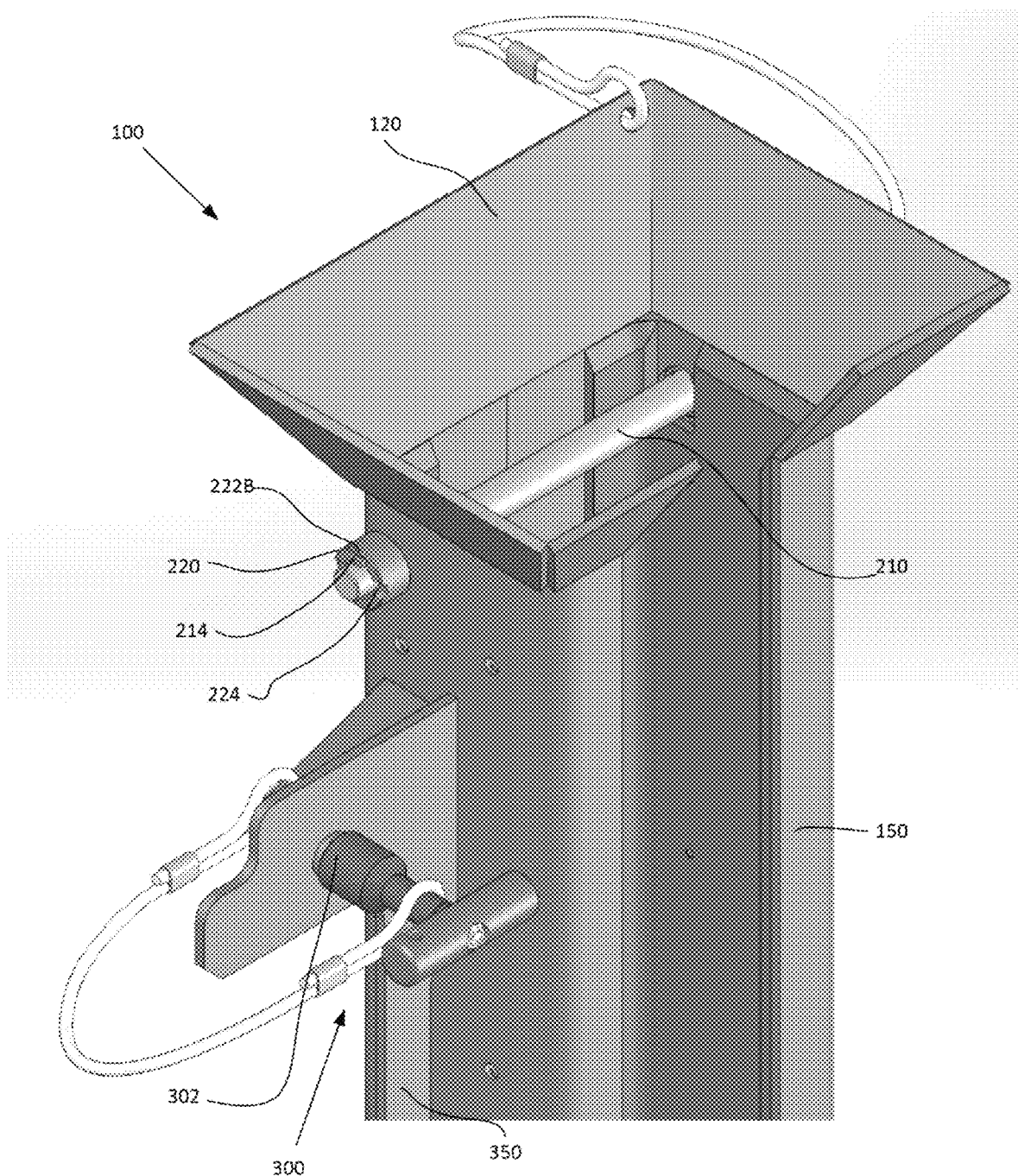
FIG. 7 provides a detailed top perspective view of an embodiment of the upper section of a modular securing device according to the present invention.

With reference now to FIG. 7, a detailed top perspective view of an embodiment of the upper section of the modular securing device 100 is provided. The T-handle body 210 is seen extended through the length of the interior space of the MCDU landing frame 150. The MCDU landing frame 150 may be an elongated rectangular or other suitable shape with a hollow interior portion and at least one opening on one side of the frame 150. The T-handle body 210 would secure an MCDU placed in the MCDU landing frame 150 and would keep the MCDU in place when in operation or until the MCDU is more permanently but releasably secured in the MCDU landing frame 150 by bolts, screws, or other suitable fastening means. The fixed holding bushing 220 can be seen on the exterior of the MCDU landing frame 150, a similar bushing 221 would be mounted on the opposite exterior surface of the MCDU landing frame 150. The quick-alignment pin 214 is in the quick-alignment slot 222B, indicating that the pin is not fully engaged and locked in the locking indentations 224. The ACME threaded T-handle shaft/stud assembly 300 with ACME threaded T-handle body 302 is shown secured to the stud portion of the assembly on the removable parking plate frame 350.

Figure 8:
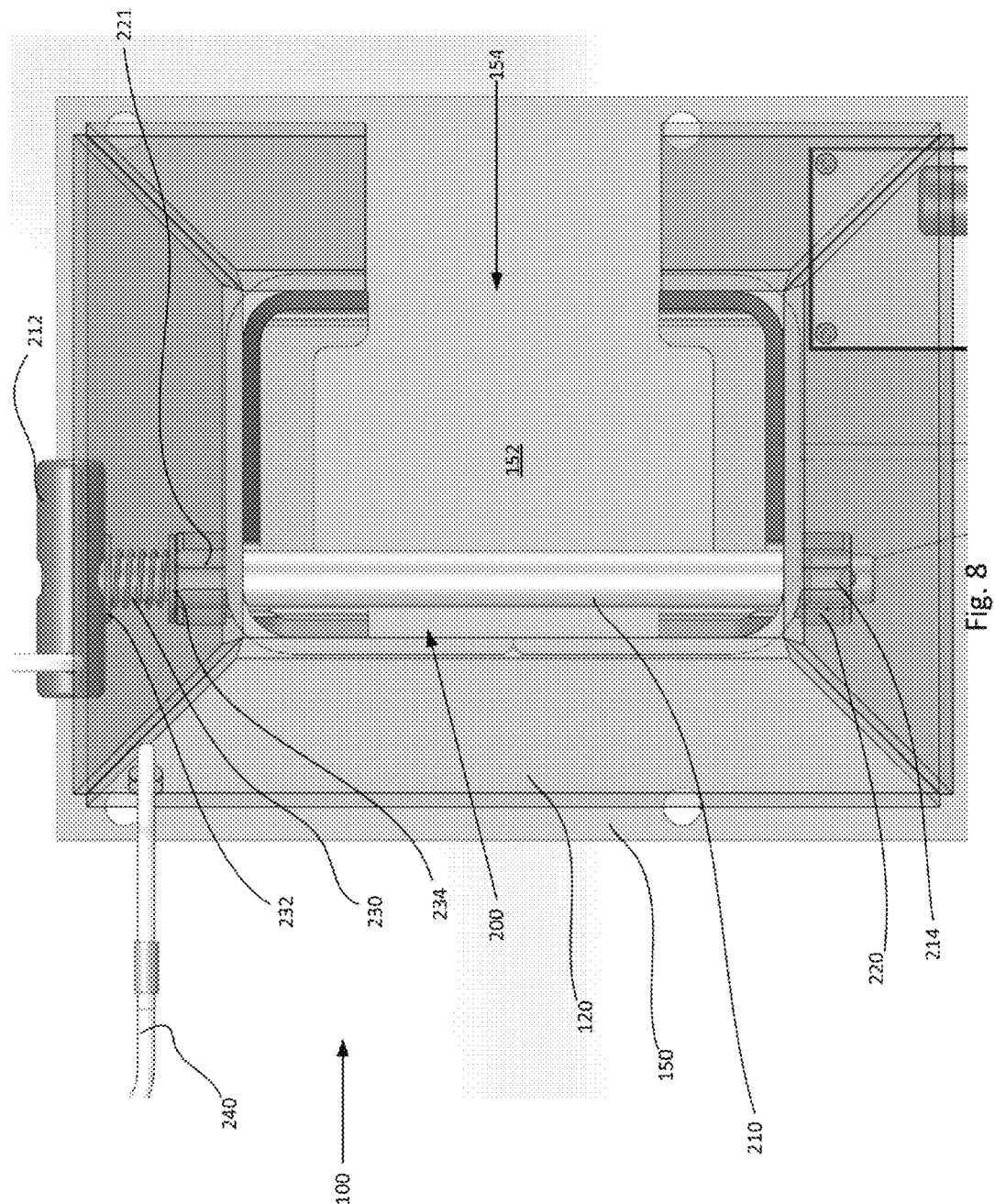
FIG. 8 provides a plan view of an embodiment of the upper section of a modular securing device according to the present invention.

With reference now to FIG. 8, a plan view of an embodiment of the upper section of a modular securing device is provided. The T-handle body 210 is shown extending through the fixed holding bushing 221, the central area 152, and the fixed holding bushing 220 of the modular securing device 100. In operation, an MCDU would be secured by the T-handle locking key 200 in the central area 152 with MCDU connectors facing towards the opening 154. To lock the T-handle locking key 200, the T-handle 212 would be depressed inwardly towards the fixed holding bushings 221 and 220, compressing the spring 230 between the plates 232 and 234. This inward force would extend the quick-alignment pin 214 beyond the fixed holding bushing 220 so that the pin 214 and T-handle locking key 200 could be rotated by a force on the T-handle 212 into a locked position. In an unlocked and removed position, the T-handle locking key 200 is secured to the MCDU landing frame 150 by the lanyard 240. The upper frame portion 120 is angled or sloped down and inwardly towards the central area 152 to facilitate installation and removal of an MCDU.

Figure 9:
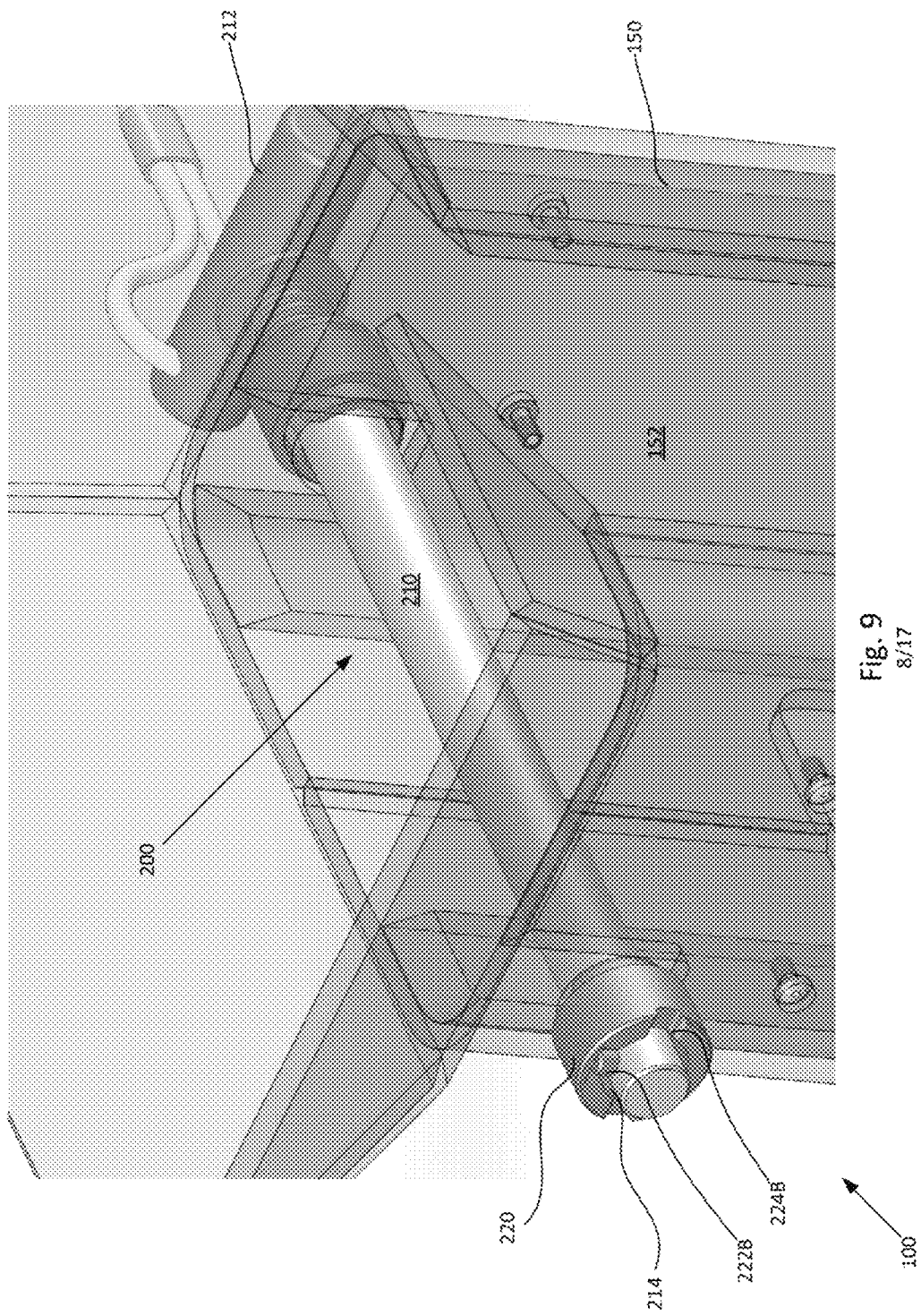
FIG. 9 provides a detailed cutaway top perspective view of an embodiment of the upper section of a modular securing device including the T-handle locking key according to the present invention.

With reference now to FIG. 9, a partial detailed cutaway top perspective view of an embodiment of the upper section of a modular securing device 100 including the T-handle locking key 200 is provided. The T-handle locking key 200 is in an inserted but not locked position. The body 210 extends through the central area 152 of the modular securing device 100 and the T-handle 212 is in a horizontal orientation. The quick-alignment pin 214 is in the quick-alignment slot 222B and not locked into one of the locking indentations 224B. When locked, the T-handle 212 would be rotated, in this example, into a vertical orientation by rotating the handle 212 ninety degrees clockwise or counter clockwise after depressing the handle inwardly towards the MCDU landing frame 150. This inward force and subsequent rotation would cause the quick-alignment pin 214 to first extend out from the fixed bushing 220 and then to rotate from the quick-alignment slot 222B into one of the locking indentations 224B.

Figure 10:
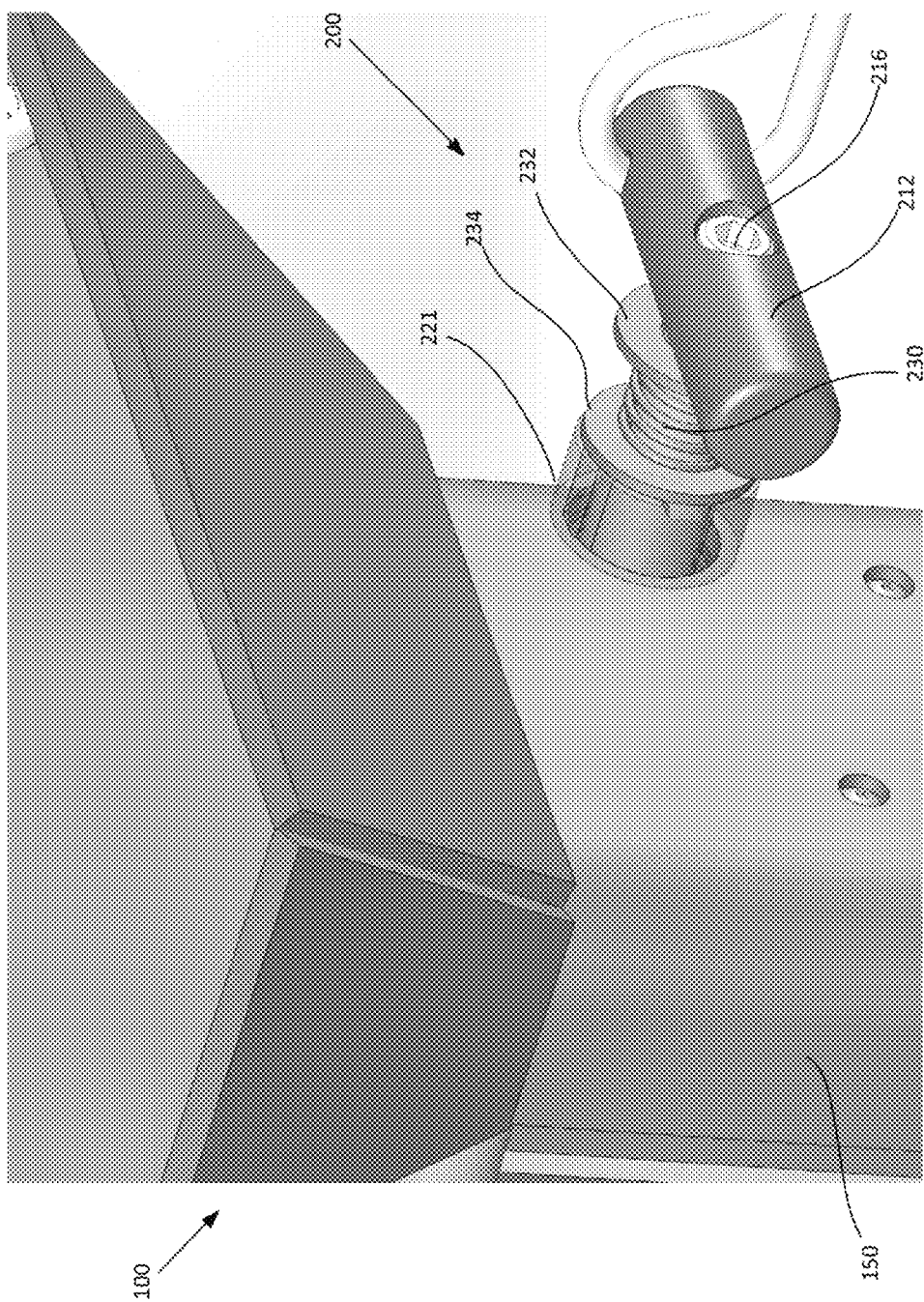
FIG. 10 provides a detailed perspective view of an embodiment of the upper section of a modular securing device and the handle of the T-handle locking key with a cutaway view of the fixed holding bushing according to the present invention.

With reference now to FIG. 10, a partial detailed perspective view of an embodiment of the upper section of a modular securing device 100 and the handle of the T-handle locking key 200 with a cutaway view of the fixed holding bushing 221 is provided. In the unlocked state, shown, the T-handle 212 is in a horizontal orientation and the T-handle body 210 is inside the fixed holding bushing 221. To lock, the T-handle 212, attached to the T-handle body 210 by screw 216, is first depressed inwardly. This inward depression exerts a force against the biasing force of the tension spring 230. The tension spring 230 is compressed between the inner spring plate 232 and outer spring plate 234. When the spring 230 is fully compressed and the quick-alignment pin 214 extends beyond the fixed holding bushing 220, shown in FIG. 9, the T-handle 212 may be rotated into a vertical or locked position. When the inward depression force on the T-handle 212 is released, the biasing force of the spring 230 locks the quick-alignment pin 214 into place in the locking indentations 224B.

Figure 11:
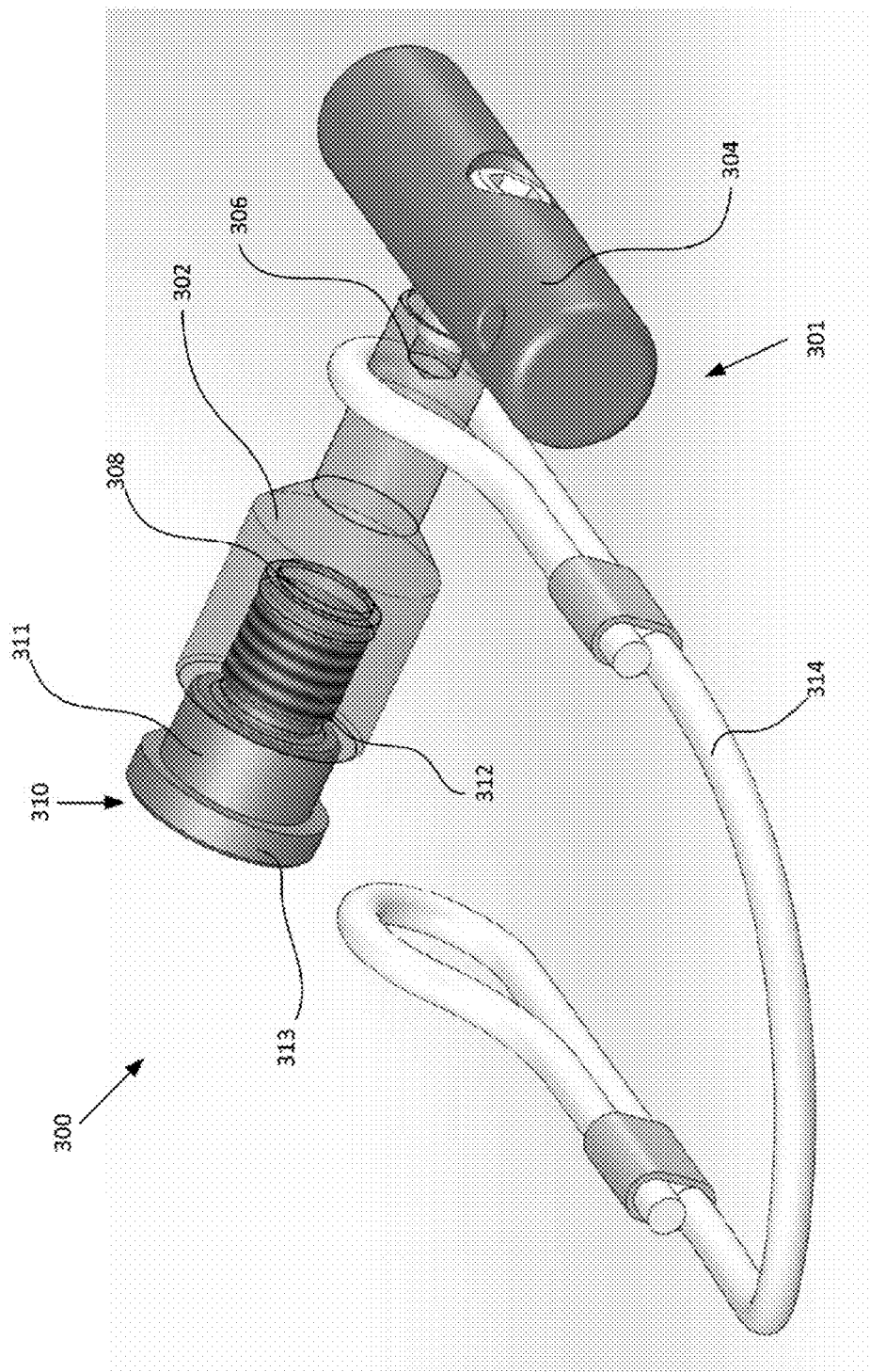
FIG. 11 provides a detailed cutaway view of an embodiment of a T-handle retain ACME threaded shaft and ACME threaded stud assembly according to the present invention.

With reference now to FIG. 11, a detailed cutaway view of an embodiment of a T-handle retain ACME threaded shaft/stud assembly 300 is provided. The T-handle ACME threaded shaft/stud assembly 300 comprises the handle assembly 301 and the stud assembly 310. The handle 304 is connected to the handle body 302 by the handle extension 306. The handle body 302 has a hollow threaded interior 308. The hollow threaded interior 308 may be ACME threaded, or threaded in any other suitable manner. The threads in the hollow threaded interior 308 correspond to threads on the threaded portion 312 of the stud assembly 310. The threaded portion 312 is raised from the base 313 of the stud assembly 310 and is separated from the base 313 by the spacer 311. When in use, the body 302 of the handle assembly 301 secures a parking plate to the parking frame 350 (shown in FIG. 12) on the spacer 311 between the body 302 and the base 313 through a force exerted by tightening the handle 304 on the threads of the threaded portion 312. The handle assembly 301 may be secured to the parking frame 350 by a lanyard 314 or other suitable securing means. The handle assembly 301 and stud assembly 310 may be made of brass or other suitable material that is resistant to corrosive and high pressure environments, is resistant to galvanic corrosion, and has a low coefficient of friction.

Figure 12:
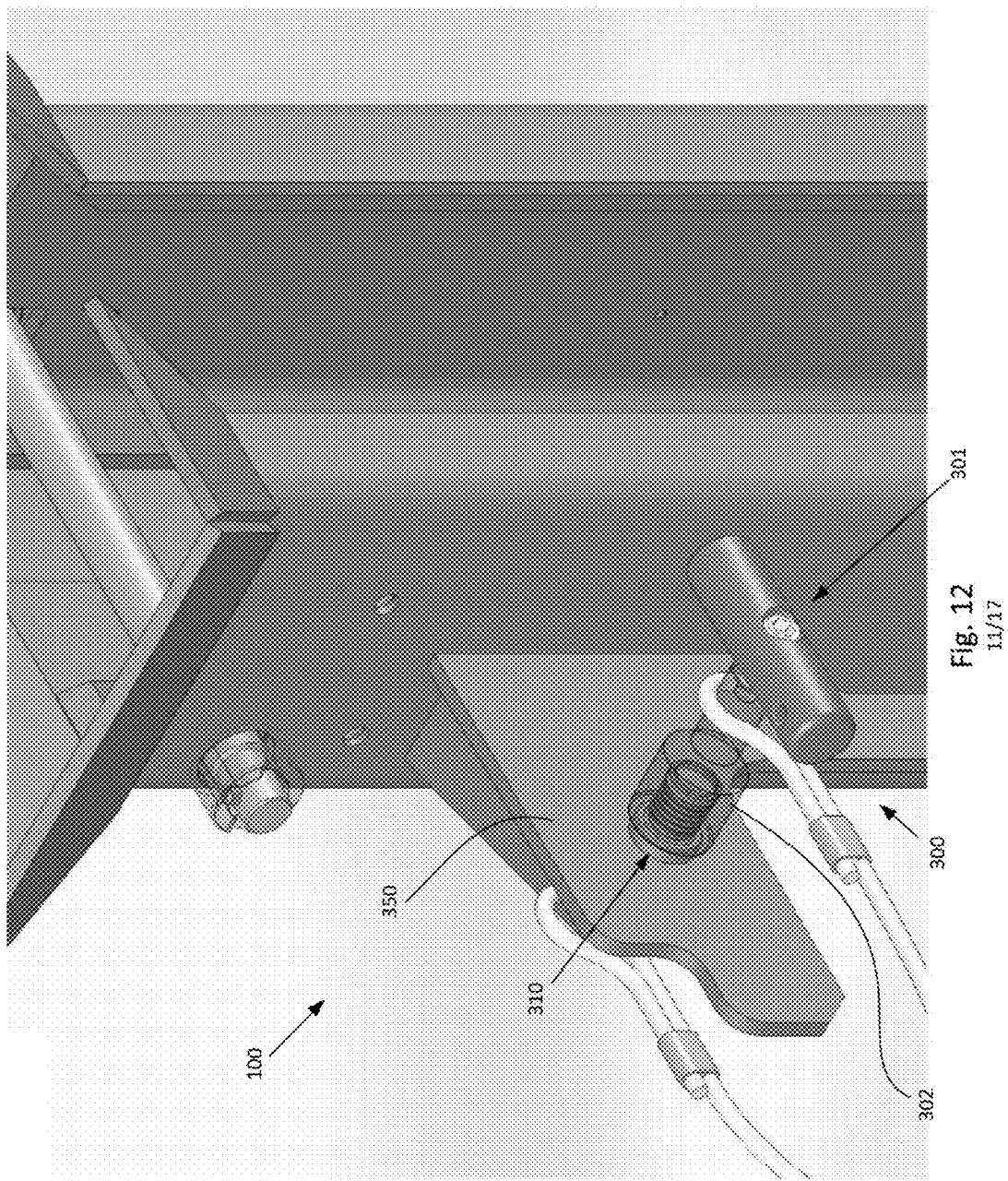
FIG. 12 provides a detailed perspective view of an embodiment of the upper section of a modular securing device, ACME threaded T-handle shaft and ACME threaded stud assembly according to the present invention.

With reference now to FIG. 12, a detailed perspective view of an embodiment of the upper section of a modular securing device 100, ACME threaded T-handle shaft 301 and ACME threaded stud assembly 310 is provided. The stud assembly 310 is secured to the parking plate frame 350. The stud assembly 310 may be welded to the parking plate frame 350 or secured by other suitable securing means such as by a corrosion resistant bolt. The body 302 of the handle assembly 301 is secured on the threads of the stud assembly 310. The handle assembly 301 may be loosened by rotating the handle 304 in a counter-clockwise motion or tightened by rotating the handle in a clockwise motion about the stud assembly 310.

Figure 13:
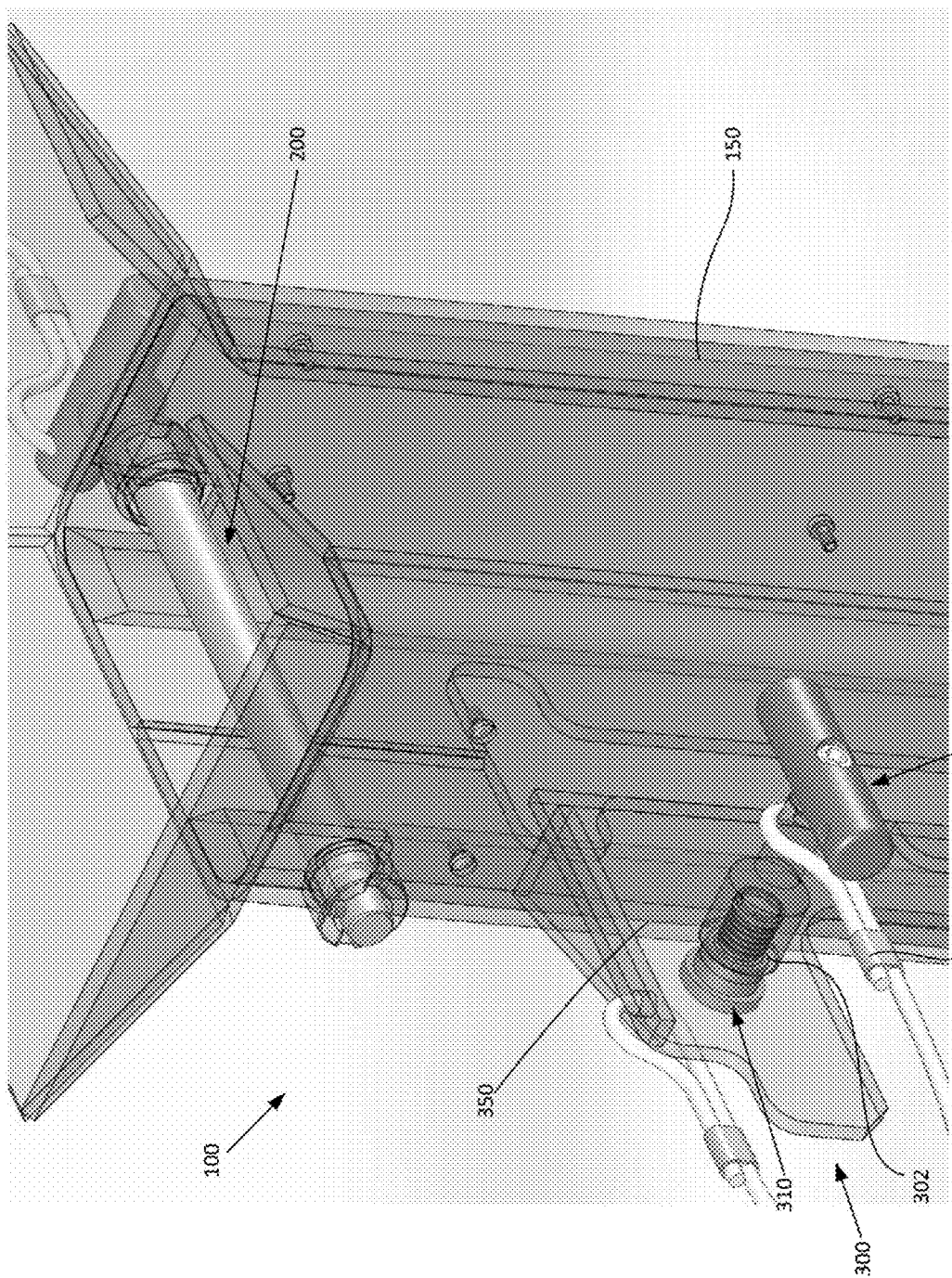
FIG. 13 provides a detailed cutaway perspective view of an embodiment of the upper section of a modular securing device, ACME threaded T-handle shaft and ACME threaded stud assembly, and T-handle locking key according to the present invention.

With reference now to FIG. 13, a detailed cutaway perspective view of an embodiment of the upper section of a modular securing device 100, ACME threaded T-handle shaft 301 and ACME threaded stud assembly 310, and T-handle locking key 200 is provided. The parking plate frame 350 is attached to the side of the MCDU landing base/frame 150. The T-handle locking key 200 is inserted into the MCDU landing frame 150 and the T-handle threaded shaft/stud assembly 300 is attached to the parking plate frame 350. The body 302 of the handle assembly 301 is threaded onto the stud assembly 310.

Figure 14:
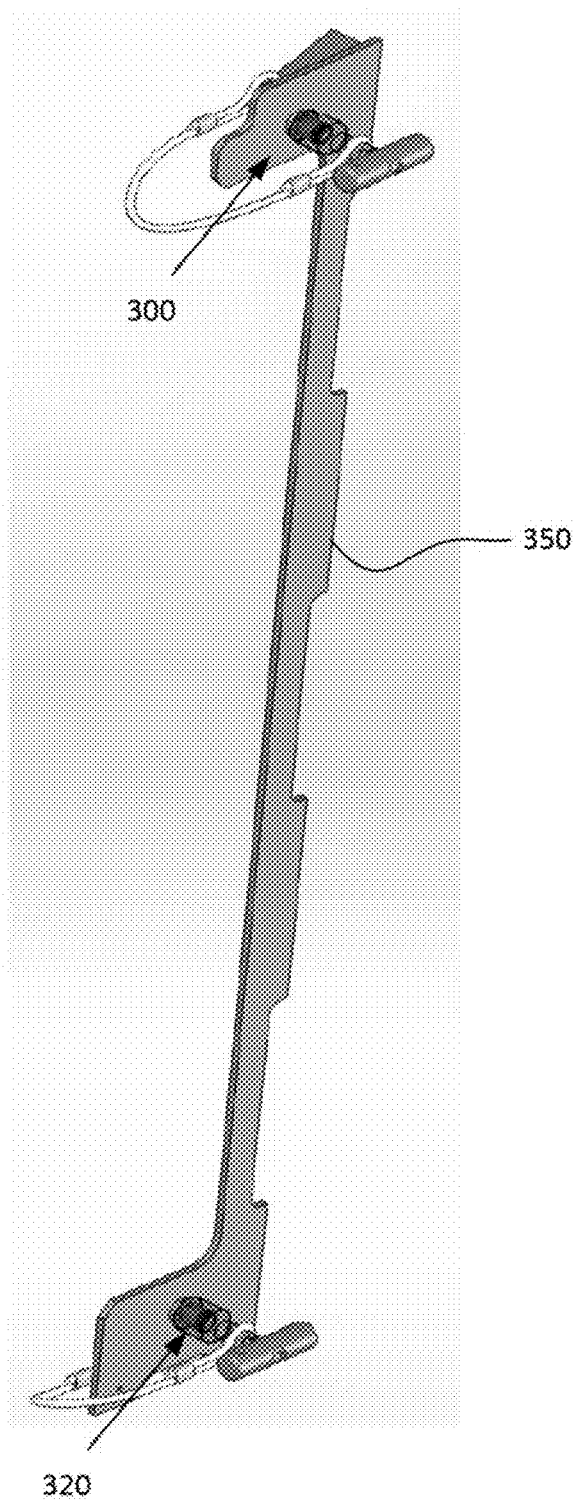
FIG. 14 provides a detailed perspective view of an embodiment of an upper and lower ACME threaded T-handle shaft and ACME threaded stud assembly according to the present invention.

With reference now to FIG. 14, a detailed perspective view of an embodiment of an upper and lower ACME threaded T-handle shaft and ACME threaded stud assembly, 300 and 320 respectively, attached to a parking plate frame 350 is provided. The upper T-handle assembly 300 and lower T-handle assembly 320 may secure a parking positions plate (such as parking positions plate 1502 of FIG. 15) to the parking plate frame 350. To secure a plate, the handles, such as handle assembly 301, must be unthreaded from the stud assemblies, such as stud assembly 310 as shown in FIG. 11. When both the upper T-handle assembly 300 and lower T-handle assembly 320 have been unthreaded, a parking plate may be positioned on the parking plate frame 350.

Figure 15:
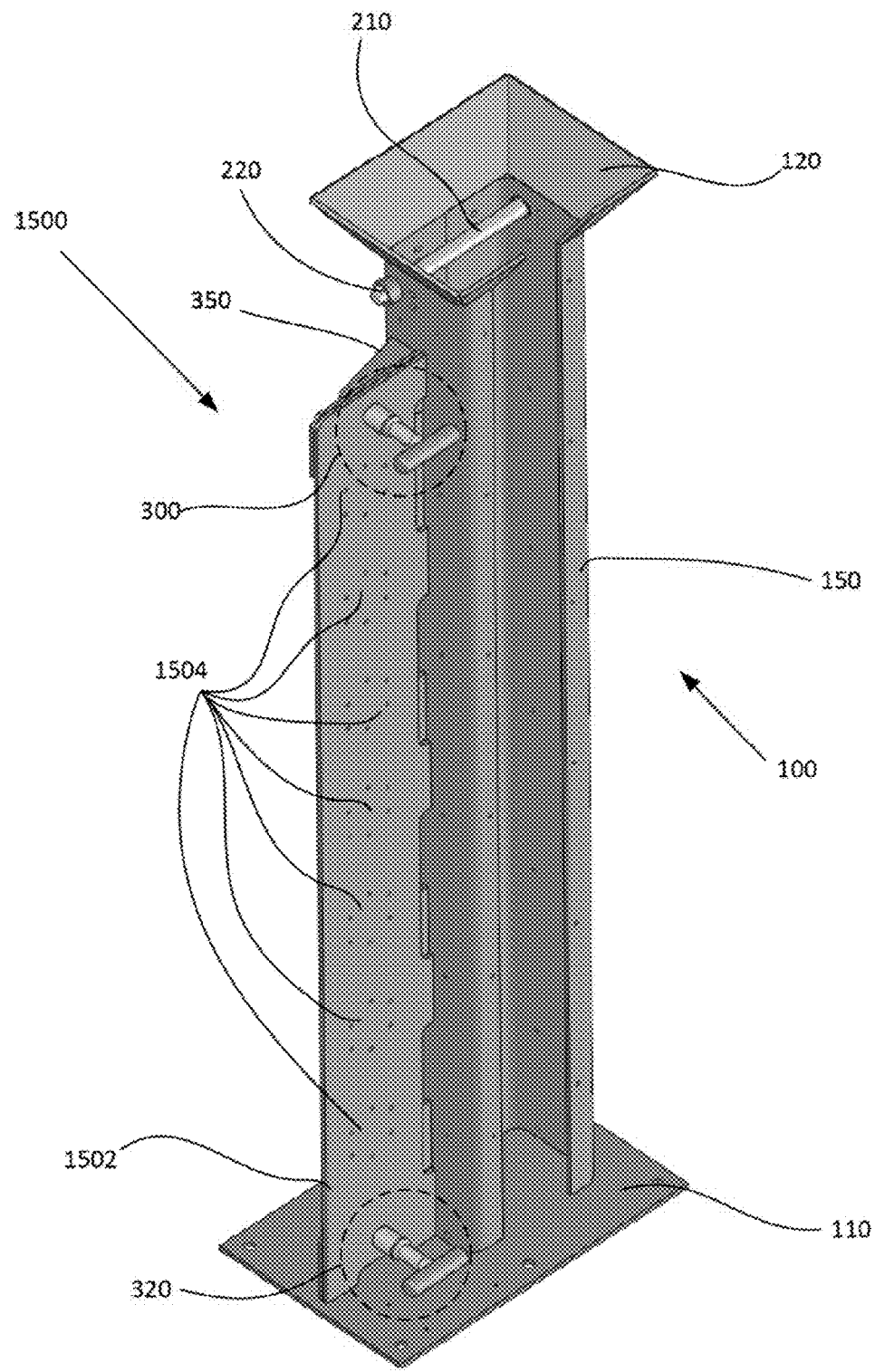
FIG. 15 provides a perspective view of an embodiment of the modular securing device with attached parking plate according to the present invention.

FIG. 15 is a perspective view of an MCDU landing frame/parking plate assembly 1500 having MCDU landing frame/base 150 and assembled thereon a parking positions plate 1502 removably attached by means of T-handle threaded shaft/stud assemblies 300 and 320. In this exemplary embodiment parking positions plate 1502 is shown having seven connector assembly points 1504.

With reference now to FIGS. 16 and 17, perspective views of prior art MCDU landing base/frames 1600 (double tower) and 1700 (single tower) that may be modified with modular securing devices are provided. The modular securing devices including T-handle locking key 200 and ACME threaded shaft/stud assembly 300 may be added to either the of the MCDU landing frames 1600 or 1700. As shown, fixed parking plates 1602 and 1702 are respectively fixably mounted onto frames 1650 and 1750. With MCDUs 1610 and 1710 respectively inserted and installed within frames 1650 and 1750, connector plugs may be received in connector receptacles 1612 and 1712 respectively. During replacement of MCDU 1610 or 1710, the plugs connected to receptacles 1612 or 1712 may be de-mated and temporarily mated with parking connector terminals 1706 on frame 1750 (not shown on frame 1650). Parking connector terminals 1706 (not shown on frame 1650) are mounted onto parking plate 1702 by way of terminal mounts obscured behind terminals 1706 in FIG. 17 but shown as terminal mounts 1604 in FIG. 16. Connector plugs and connector receptacles 1612/1712 form wet-mate connections. Connector plugs for a wet-mate seal when mated with parking terminals 1706. The present invention may be adapted to work with other designs and configurations of frame assemblies in addition to the MCDU frame assemblies 1600 and 1700, both of which are shown with MCDUs installed.

Figure 18A:
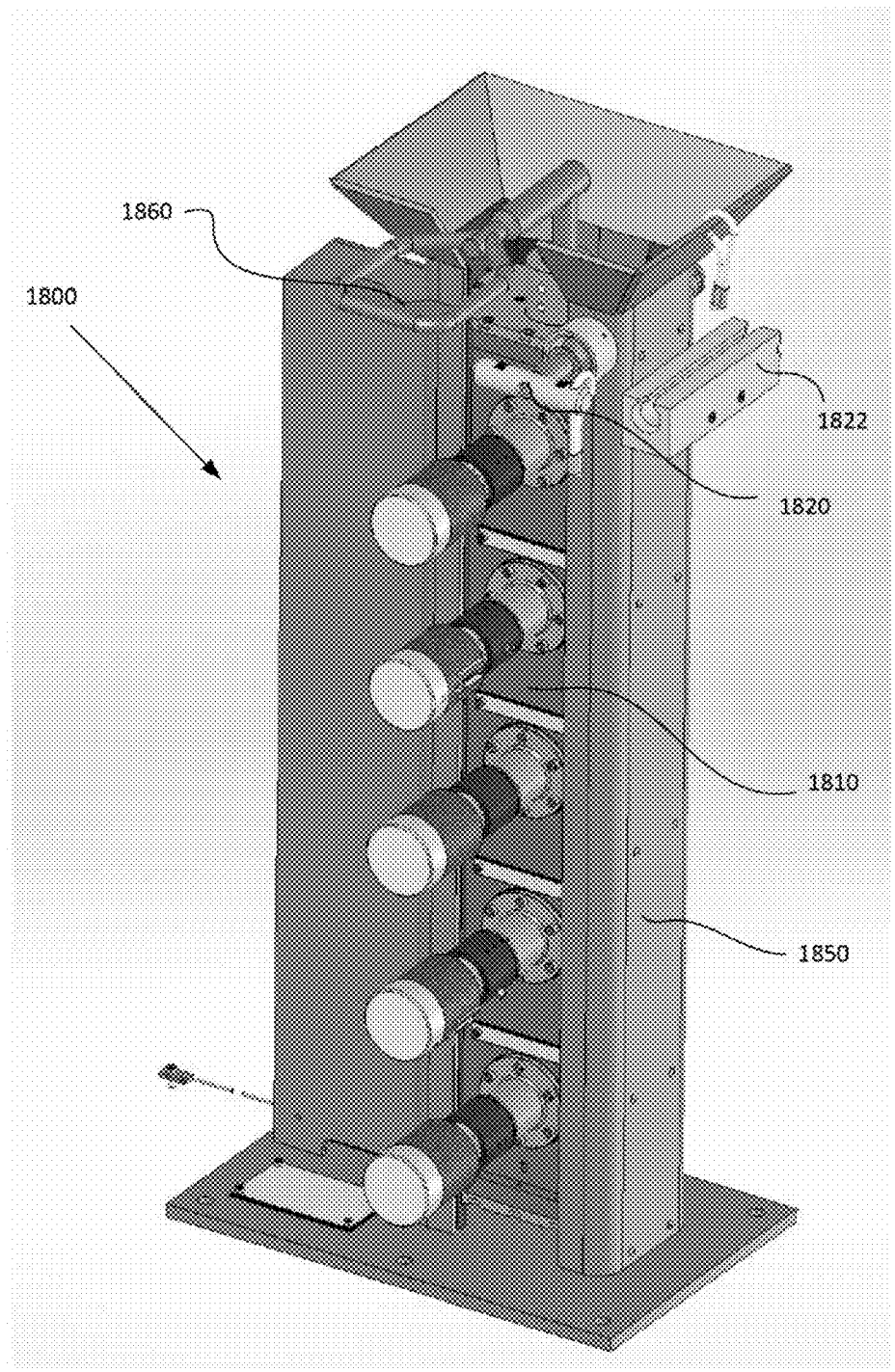
FIGS. 18A and 18B provide front and rear perspective views of an alternate embodiment of the present invention in an ROV operable configuration.
Figure 18B:
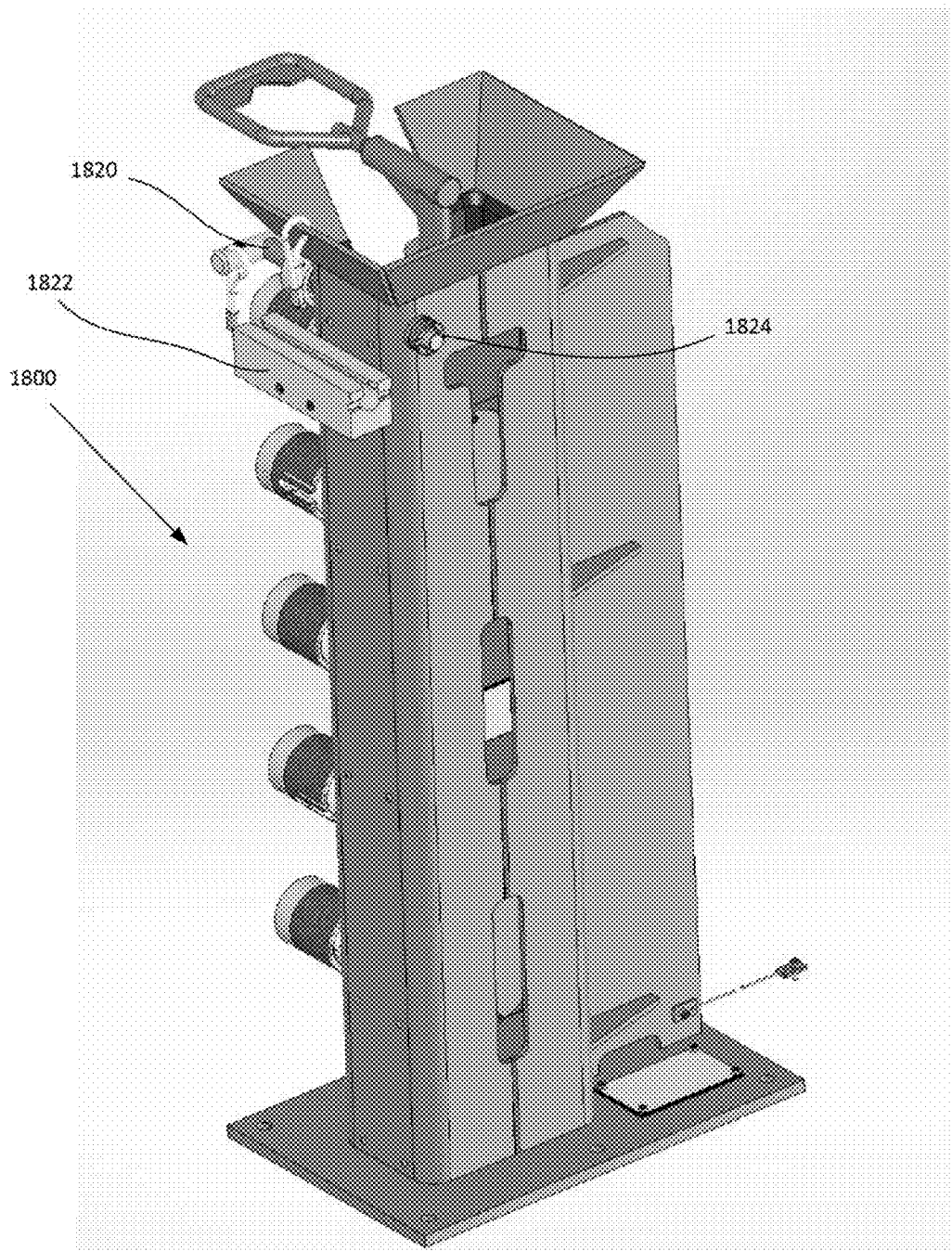

With reference now to FIGS. 18A and 18B, front and rear perspective views of an alternate embodiment of the present invention in an ROV operable configuration are provided. The modular MCDU securing device 1800 comprises the MCDU landing frame 1850, MCDU 1810, T-handle locking key 1820, and T-handle locking key docking assembly 1822. The T-handle locking key 1820 is installed in an unlocked position. The fixed bushing 1824 and T-handle locking key 1820 are similar to the T-handle locking key 200 and fixed bushing 220 shown in FIG. 3, however, the T-handle locking key 1820 extends inwardly from the front to the rear of the MCDU landing frame 1850. This configuration provides for easier manipulation of the T-handle locking key 1820 by an ROV. When removed from the MCDU frame 1850, the T-handle locking key 1820 may be placed in the docking assembly 1822 so that an ROV may easily manipulate the MCDU handle 1860 to remove the MCDU 1810. After the MCDU 1810 is removed, or after a new MCDU is inserted, the T-handle locking key 1820 may be removed from the docking assembly 1822 and locked back into the MCDU landing assembly 1850 in the fixed bushing 1824.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

The invention claimed is:

1. A modular securing device comprising:
   a frame having a base, a top, and a body, said body having a front, a back, and extending vertically from said bottom to said top and having a hollow central area adapted to receive a modular connection unit and an opening extending the length of the front through which connections may be made;
   a locking key assembly comprising:
      a locking key comprising:
         an elongated body having a front end, a back end, and an exterior surface;
         a t-shaped handle attached to said back end;
         a raised protrusion extending vertically from said exterior surface at said front end;
      a spring assembly comprising a tension spring disposed on the elongated body intermediate an inner plate and an outer plate, and said spring surrounding said elongated body between said inner plate and said outer plate; and
      a set of bushings having a front face and a back face, and a central bore, said back face attached to said frame, said set of bushings adapted to receive said front end of said elongated body and having a guide channel adapted to guide said raised protrusion of said locking key when receiving said front end of said elongated body, and a recess formed therein for receiving the raised protrusion;
   whereby with said locking key introduced into said frame said t-shaped handle is adapted to be pushed forward to compress said tension spring between said inner and outer plates and to cause the raised protrusion to extend outward from the guide channel, said locking key adapted to rotate to lock in a fixed position with said raised protrusion engaging the recess, thereby securing a modular connection unit received in the frame central hollow area in place.

2. The modular securing device of claim 1, wherein said locking key assembly is located at said top of said frame and is adapted to permit said locking key to pass through said frame.

3. The modular securing device of claim 1, wherein said locking key is attached to said frame by a flexible securing means.

4. The modular securing device of claim 3, wherein said flexible securing means is a braided cable.

5. The modular securing device of claim 1, wherein said set of bushings comprises a first bushing and a second bushing.

6. The modular securing device of claim 1, wherein said set of bushings have a set of indentations on said front of said bushings adapted to secure said raised protrusion of said locking key.

7. The modular securing device of claim 1, further comprising a set of threaded securing assemblies comprising:

a cylindrical stud assembly having a top and a bottom, and a body extending from said bottom to said top, said body having an exterior, said exterior having a threaded portion; and a cylindrical handle assembly having a top and a bottom, a body extending from said top to said bottom, said bottom having an opening, said body having a hollow interior threaded portion, and a handle attached to said top.

8. The modular securing device of claim 7, wherein said cylindrical stud assembly threaded portion and said cylindrical handle assembly hollow threaded portion comprise ACME threading.

9. The modular securing device of claim 7, wherein said locking key assembly and said set of threaded securing assemblies are comprised of a material resistant to galvanic corrosion.

10. The modular securing device of claim 7, wherein said body of said cylindrical stud assembly and said body of said cylindrical handle assembly are comprised of brass.

11. The modular securing device of claim 1, wherein said frame is adapted to receive a modular connectorized distribution unit (MCDU).

12. The modular securing device of claim 1, wherein said frame further comprises a mounting assembly, said mounting assembly having a front and a back, and a first side and a second side, said first side disposed on the frame and said mounting assembly extending outwardly from the frame.

13. A modular securing apparatus comprising:
a locking key assembly comprising:
an elongated locking key body with a first and a second end and having a handle on said first end and a raised protrusion on said second end;
said elongated locking key assembly having a spring assembly at said first end, said spring assembly comprising a spring, an inner spring plate, and an outer spring plate;
a set of bushings adapted to receive said elongated locking key assembly and said raised protrusion and having a set of locking indentations, said set of bushings comprising a first bushing and a second bushing; and
wherein said spring assembly is adapted to compress to allow said raised protrusion to pass through said set of bushings and is further adapted to secure said raised protrusion in one of said set of locking indentations.

14. The modular securing apparatus of claim 13 further comprising a set of threaded securing assemblies comprising:

a body portion having an exterior threaded portion; and
a handle portion having an interior threaded portion and adapted to receive said body portion.

15. The modular securing apparatus of claim 14, further comprising a frame having a base, a top, and a body, said body having a hollow central area and an exterior surface;
wherein elongated locking key assembly is disposed near said top of said frame; and
wherein said threaded securing assemblies are disposed on the exterior surface.

16. The modular securing apparatus of claim 15, wherein said elongated locking key assembly is located at said top of said frame and is adapted to permit said locking key body to pass through said frame.

17. The modular securing apparatus of claim 15, wherein said locking key is attached to said frame by a flexible securing means.

18. The modular securing apparatus of claim 17, wherein said flexible securing means is a braided cable.

19. The modular securing apparatus of claim 15, wherein said frame is adapted to receive a modular connectorized distribution unit (MCDU).

20. The modular securing apparatus of claim 15, wherein said frame further comprises a mounting assembly, said mounting assembly having a front and a back, and a first side and a second side, said first side disposed on the frame exterior and said mounting assembly extending outwardly from said frame.

21. The modular securing apparatus of claim 20, wherein said threaded securing assemblies are disposed on said front of said mounting assembly.

22. The modular securing apparatus of claim 14, wherein said body threaded portion and said handle interior threaded portion comprise ACME threading.

23. The modular securing apparatus of claim 14, wherein said locking key assembly and said set of threaded securing assemblies are comprised of a material resistant to galvanic corrosion.

24. The modular securing apparatus of claim 14, wherein said body of said cylindrical stud assembly and said body of said cylindrical handle assembly are comprised of brass.

25. The modular securing apparatus of claim 13, wherein said set of bushings have a set of indentations on said front of said bushings adapted to secure said raised protrusion of said locking key.

* * * * *